United States Patent
Enriquez

(10) Patent No.: US 6,873,703 B1
(45) Date of Patent: Mar. 29, 2005

(54) PRECISION, LOW-POWER CURRENT-SENSE TRANSMISSION CHANNEL FOR SUBSCRIBER LINE INTERFACE CIRCUIT, PROGRAMMABLE WITH SINGLE ENDED IMPEDANCES AND CAPABLE OF EXHIBITING A VOLTAGE SENSE RESPONSE

(75) Inventor: Leonel Ernesto Enriquez, Melbourne Beach, FL (US)

(73) Assignee: Intersil Corporation, Palm Bay, FL (US)

( * ) Notice: Subject to any disclaimer, the term of this patent is extended or adjusted under 35 U.S.C. 154(b) by 651 days.

(21) Appl. No.: 09/686,505

(22) Filed: Oct. 11, 2000

(51) Int. Cl.[7] .......................... H04M 1/00; H04M 9/00; H04M 9/08
(52) U.S. Cl. .................. 379/399.01; 330/100; 330/150; 330/151; 330/255; 330/259; 327/89; 327/560; 327/561; 327/562; 327/563
(58) Field of Search .............................. 330/100, 15.1, 330/255, 257–261, 150, 151; 327/89, 560–563; 379/399.01

(56) References Cited

U.S. PATENT DOCUMENTS

| | | | |
|---|---|---|---|
| 4,091,333 A | 5/1978 | Thrap | 330/100 |
| 4,272,656 A * | 6/1981 | Nishikawa | 379/405 |
| 4,336,502 A | 6/1982 | Goto | 330/253 |
| 4,558,287 A | 12/1985 | Tanaka | 330/257 |
| 5,210,506 A | 5/1993 | Koch et al. | 330/255 |
| 5,357,210 A | 10/1994 | Miljanic et al. | 330/15.1 |
| 5,640,128 A | 6/1997 | Wilhelm | 330/308 |
| 5,671,272 A | 9/1997 | Cotreau | 379/382 |
| 5,929,623 A | 7/1999 | Hoshino | 330/257 |
| 6,028,482 A | 2/2000 | Herrle | 330/282 |
| 6,154,094 A | 11/2000 | Seven | 330/257 |
| 6,292,033 B1 | 9/2001 | Enriquez | 327/89 |
| 6,301,358 B1 * | 10/2001 | Chen et al. | 379/413 |

* cited by examiner

Primary Examiner—Duc Nguyen
Assistant Examiner—Alexander Jamal
(74) Attorney, Agent, or Firm—Allen, Dyer, Dopplelt, Milbrath & Gilchrist, P.A.

(57) ABSTRACT

A transmission channel for a subscriber line interface circuit comprises a front end, tip/ring current-sensing transimpedance stage, containing relatively low valued tip and ring sense resistors coupled in circuit with tip and ring paths of a telecommunication wireline pair. The front end transimpedance stage transforms differential tip and ring input currents sensed by the tip and ring sense resistors into a single ended voltage, which is coupled to a transconductance amplifier filter/gain stage. The filter/gain stage is configured to provide a programmable output impedance, and converts the voltage from the current-sensing transimpedance stage into an output transmission voltage for application to a selected one of a current-sense, voltage-feed, or voltage-sense, voltage-feed telecommunication circuit.

13 Claims, 4 Drawing Sheets

PRECISION, LOW-POWER CURRENT-SENSE TRANSMISSION CHANNEL FOR SUBSCRIBER LINE INTERFACE CIRCUIT, PROGRAMMABLE WITH SINGLE ENDED IMPEDANCES AND CAPABLE OF EXHIBITING A VOLTAGE SENSE RESPONSE

CROSS REFERENCE TO RELATED APPLICATIONS

The present invention relates t o subject matter disclosed in my co-pending U.S. patent application Ser. No. 09/639,408, entitled: "Transconductance Amplifier Circuit," filed Aug. 14, 2000 (hereinafter referred to as the '408 application), and my co-pending U.S. patent application, Ser. No. 09/686,506 entitled: "Precision, Low-Power Transimpedande Circuit with Differential Current Sense Inputs and Single Ended Voltage Output," filed coincident herewith (hereinafter referred to as the '506 application), both applications being assigned to the assignee of the present application, and the disclosures of which are incorporated herein.

FIELD OF THE INVENTION

The present invention relates in general to communication systems and components, and is particularly directed to a new and improved transmission channel for a subscriber line interface circuit, that is programmable with single ended impedances and is configured to exhibit a voltage sense response. The transmission channel contains a front end or input transimpedance stage that is coupled in cascade with transconductance amplifier stage-based filter/gain output stage. The transimpedance input stage is configured to transform differentially sensed tip and ring input currents of a telecommunication wireline pair into a precise, single ended voltage. This single ended voltage is transformed by the transconductance amplifier based filter/gain output stage into a very precise, single ended output current, that is converted to a single ended output voltage for application to downstream voltage-fed circuitry. In addition, the output impedance presented by the filter/gain output stage of the transmission channel is programmable by means of a single programming pin.

BACKGROUND OF THE INVENTION

The transmission channels of subscriber line interface circuits, or SLICs, employed by telecommunication service providers include a very demanding set of performance requirements including accuracy, linearity, insensitivity to common mode signals, low power consumption, low noise, filtering, and ease of impedance matching programmability, to facilitate interfacing the SLIC with a variety of telecommunication circuits including those providing digital codec functionality. In a typical application, the length of the wireline pair to which a SLIC is connected can be expected to vary from installation to installation, may have a very significant length (e.g., on the order of multiple miles), and transports both substantial DC voltages, as well as AC signals (e.g., voice and/or ringing). As a consequence, it has been difficult to realize a SLIC implementation that has 'universal' use in both legacy and state of the art installations.

SUMMARY OF THE INVENTION

In accordance with the present invention, the above requirements for a SLIC transmission channel are successfully achieved by means of a new and improved combination of a front end, current-sensing transimpedance stage that is coupled in cascade with a transconductance amplifier-configured filter/gain output stage. The current-sensing transimpedance stage is operative to transform differentially sensed tip and ring input currents of a telecommunication wireline pair into a precise, single ended voltage. This single ended voltage is then transformed by the transconductance amplifier-based filter/gain output stage into a very precise, single ended output current, and converted into a single ended output voltage for application to downstream voltage-fed circuitry. In addition, the transmission channel is configured to have the output impedance it presents to the line programmable by means of a single programming pin.

The transimpedance stage includes respective (tip and ring associated) current sense resistors installed in the closed loop, negative feedback paths of 'tip' and 'ring' path current sense amplifiers. The currents through the sense resistors flow may contain a desirable differential current component and an undesirable common mode component. The current sense amplifiers provide substantial performance in terms of gain and gain-bandwidth product, so that any voltage dropped across the sense resistors appear as a negligibly small component of the voltage between the tip and ring terminals of the SLIC.

A voltage drop proportional to the current through each of the (tip/ring path) sense resistors is supplied as a differential control voltage to respective differential coupling circuits installed between associated bias current sources and the complementary polarity inputs of an operational amplifier, that provides the single ended output voltage. Each bias current source is coupled through an associated pair of bias resistors for the differential coupling circuits. The maximum current that can be sensed in each complementary (tip/ring) current flow path of the transimpedance circuit is limited by the product of a maximum bias current supplied by the respective (tip and ring path) bias current sources and the ratio of a pair of transistor emitter bias resistances to the resistance value of the (tip and ring path) sense resistors.

In addition to differentially sensing the complementary (tip and ring) currents flowing through the sense resistors and their associated differential coupling circuits, the input terminals of the operational amplifier are coupled to a linearity compensator circuit, which is configured to provide sufficient overhead voltages in the presence of worst case voltage swing conditions. The linearity compensator circuit has a differential amplifier configuration, coupled to close a negative feedback loop from the single ended output and one of the inputs to the operational amplifier, relative to a reference voltage balancing path coupled to the amplifier's other (complementary) input. This balanced coupling configuration forces corresponding terminals of a pair of load resistors coupled to the input ports of the operational amplifier to the same potential, irrespective of variations in the sensed input currents.

For this purpose, a first differential compensator portion of the linearity compensator includes a first 'overhead voltage' emitter-follower transistor having its collector-emitter path coupled in circuit with a first bias current source. This first overhead transistor has its base coupled to receive a reference voltage established by a voltage drop across a resistor coupled to receive a prescribed overhead bias current. The emitter output of the first overhead transistor provides base drive to a first emitter-follower configured compensator transistor pair, the current output of which is coupled through a first load resistor to the non-inverting input of the operational amplifier.

To close the negative feedback loop of the operational amplifier, a second compensator portion of the linearity compensator includes a second overhead voltage emitter-follower transistor having its collector-emitter path coupled in circuit with a second bias current source, and its base coupled through a feedback resistor to the single ended voltage output of the operational amplifier. The emitter output of the second overhead transistor provides base drive to a second emitter-follower configured compensator transistor pair, the current output of which is coupled through a second load resistor to the (−) input of the operational amplifier.

By matching the bias resistors for the differential coupling circuits with the load resistors and parameters of the complementary sides of the differentially configured coupling and compensator circuits installed between the sense resistors and the operational amplifier, the single ended output voltage produced at the output of the operational amplifier is effectively linearly definable in terms of the sensed current and the values of the sense resistors. By optimizing the match between the resistance value of the sense resistors and the resistance values of the bias resistors common mode output error is minimized.

The DC and AC components of the output voltage produced by the transimpedance stage are separated by the filter/gain output stage so as to make the DC component available for processing by the DC loop, while the AC component propagates through the transmission channel and is amplified by a prescribed gain factor for application to a transmission output terminal.

For this purpose, the filter/gain output stage includes a filter/gain section that is coupled to an output/gain section. Each of these sections incorporates a transconductance amplifier circuit of the type disclosed in the above-referenced '408 application. The transconductance amplifier circuit includes an operational amplifier configured as a single ended, unity gain buffer, having a high input impedance, moderate voltage gain, dual polarity input stage, and a low output impedance, single ended output stage. The input stage has its non-inverting polarity input referenced to a DC reference voltage, and its inverting polarity input coupled over a negative feedback path to an input/output node of the output stage. The output stage is configured as a DC biased, differentially coupled transistor buffer circuit pair.

Unlike a conventional amplifier circuit, the input/output node of the output stage, rather than being employed to supply an output current to a downstream load, is employed as an input node and is adapted to receive one or more input currents coupled via one or more coupling resistors from associated input voltage feed ports. Also, series-connected current paths through output transistors of the differentially coupled output stage buffer circuit transistor pair, rather than being powered directly by respective voltage supply rails, are coupled in circuit with first current supply paths of associated current mirror circuits, which produces a precision output current by means of second current supply paths of the current mirror circuits coupled to the single ended output port of the transconductance amplifier circuit.

The relationships among the currents through the two current supply paths of the mirror circuits and the input/output node of the output stage are such that the output current produced at the single ended output port is linearly proportional to the (composite) input current appearing at the input/output node of the output stage.

In addition, if the time average value of each of the input voltages applied to the voltage input terminals is equal to the reference voltage applied to the non-inverting input of the operational amplifier and that reference voltage is a DC voltage, then the time averages of the mirrored currents supplied to the output stage are proportional to the DC bias current flowing in the output stage. As a consequence, if the value of the DC bias current is small and the current mirror ratio K is equal to or less than one, the quiescent power can be reduced to an extremely low value.

A first output node of the output stage of the transconductance amplifier circuit of the filter/gain stage is tied to its inverting polarity input and to a high pass filter that includes an internal resistor and an externally coupled capacitor. A second output node coupled to the current mirrors supplies is coupled to the non-inverting input of an operational amplifier which is connected in a non-inverting configuration with a fixed closed loop gain. The overall gain of the filter/gain section is programmable by means of an external programming resistor coupled between a voltage reference node (e.g., ground) an input of the operational amplifier. A current-sense based transmission output voltage at the output node of the amplifier is coupled to a transmission voltage terminal.

Where the reflection characteristics of the current-sense, voltage-feed architecture of the transmission channel are acceptable, the transmission voltage output node may be employed as the transmitting terminal of the SLIC, with its output fed back to the receiver for impedance synthesis. However, when compatibility with current-feed, voltage-sense circuits is required in terms of DSP CODEC programming, the filter/gain section is coupled to an output/gain section. The output/gain section is configured similar to the filter/gain section, and contains a transconductance amplifier coupled to an output amplifier having an externally programmable gain.

DETAILED DESCRIPTION

Figure 1:
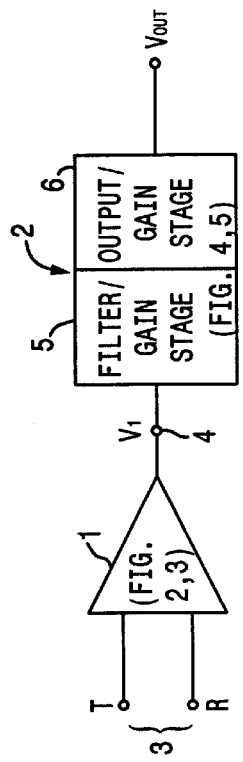
FIG. 1 diagrammatically illustrates the overall configuration of a transmission channel in accordance with a non-limiting, but preferred embodiment of the present invention.

The overall architecture of the transmission channel of the present invention is diagrammatically illustrated in FIG. 1 as comprising a front end, current-sensing input transimpedance stage 1, that is coupled in cascade with a transconductance amplifier-based filter/gain output stage 2. The transimpedance stage 1 (to be described below with reference to FIGS. 2 and 3) is preferably configured as the transimpedance circuit disclosed in the above-referenced '506 application. As such, it is operative to transform differentially sensed tip and ring input currents of a telecommunication wireline pair 3 into a precise, single ended voltage (V1) at a voltage node 4 to which the filter/gain output stage 2 is coupled.

The transconductance amplifier-based filter/output stage 2 (to be described below with reference to FIGS. 4 and 5) includes respective filter/gain and output/gain sections 5 and 6, which employ transconductance amplifiers of the type disclosed in the above-referenced '408 application. As will be described, the transconductance amplifier-based filter/ output stage 2 is operative to transform the precise, single ended voltage V1 produced by the transimpedance stage 1 at voltage node 4 into a precision, single ended output current and then feed that current as an amplified output voltage Vout to a transmission voltage output port for application to downstream telecommunication signal processing circuitry.

Figure 3:
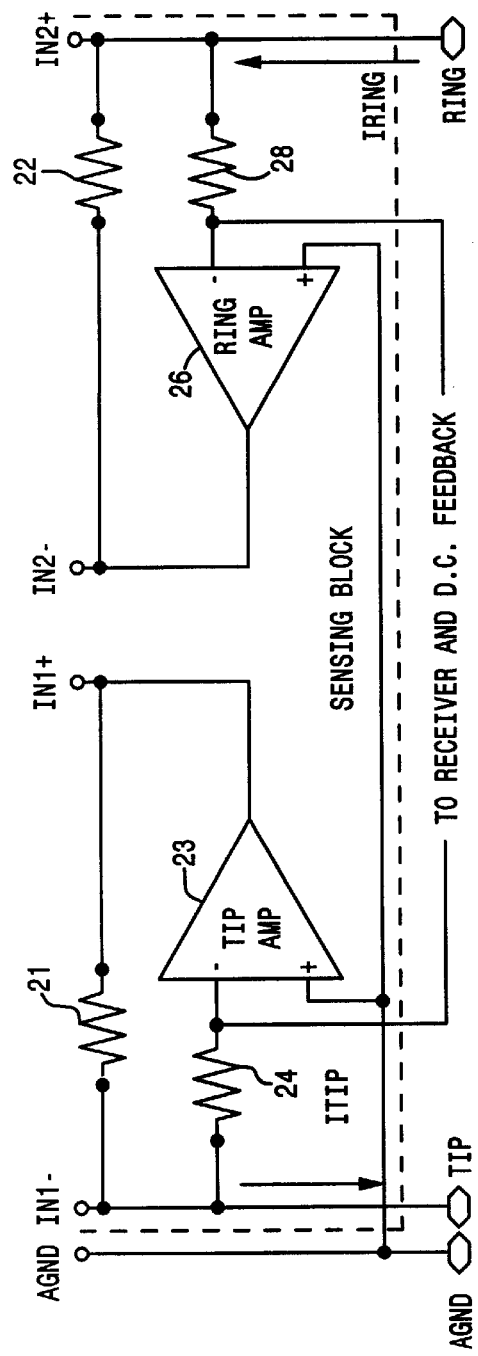
FIG. 3 shows tip and ring path sense amplifiers containing sense resistors for the transimpedance stage of FIG. 2.
Figure 2:
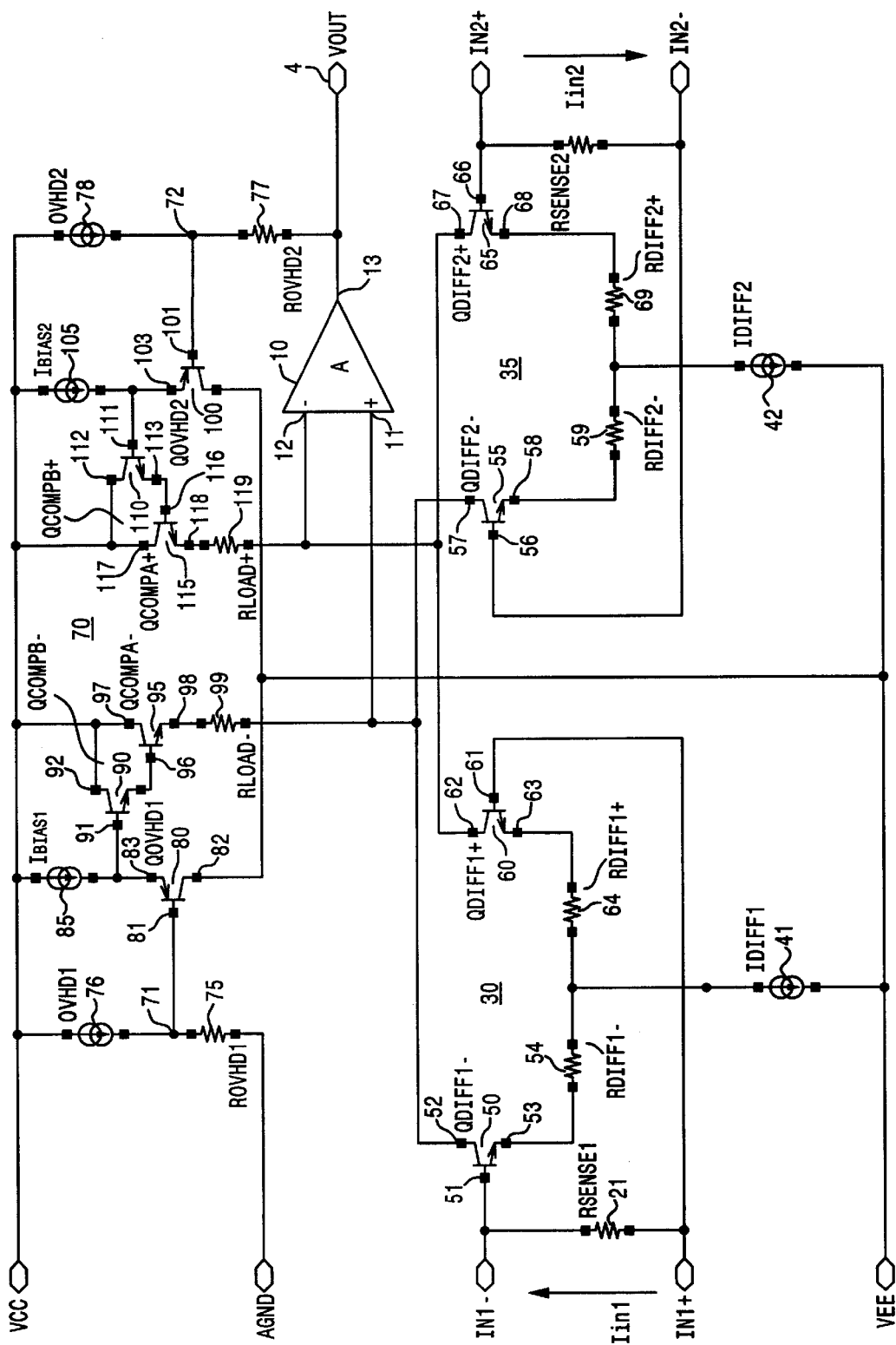
FIG. 2 diagrammatically illustrates the circuit configuration of the front end transimpedance stage of the transmission channel of FIG. 1.

Referring now to FIGS. 2 and 3 (which effectively correspond to FIGS. 1 and 2 of the above-referenced '506 application), the configuration of the transimpedance stage 1 of FIG. 1 is schematically illustrated as comprising an operational amplifier 10, having first (+) and second (−) complementary polarity, or differential, inputs 11 and 12, and a single ended output 13, which is coupled to the single ended voltage node 4. For the present embodiment of a SLIC transmission channel, the amplifier's non-inverting (+) input 11 is coupled to the tip path of the wireline (tip/ring) pair 3, while its inverting (−) input 12 may be associated with the wireline pair's ring path.

In order to sense current flowing in one of the complementary (tip and ring) signaling paths, a first (tip) sense resistor 21 is coupled between a pair of input nodes IN1+ and IN1− installed in the signaling path of interest, (e.g., the tip path of a telecommunication wireline pair), and current flow through which is denoted by a current Iin1. As will be described, the current Iin1 flowing through the first sense resistor 21 represents the tip-associated component of a summation of a desired differential current component ($I_{DIFF}$) that is to be transformed into the single ended voltage V1 at the voltage node 4, as well as an undesirable common mode or longitudinal current component $I_{COM}$ that is to be effectively rejected as a component in the single ended voltage produced at voltage node 4.

The sense resistor 21 may comprise a relatively small valued resistor (having a resistance value denoted $R_{SENSE1}$, which may be on the order of several to several tens of ohms (e.g., 20 ohms), for example), coupled between the output of a (tip) sense amplifier and its associated tip path output port of a low power receiver channel circuit of a subscriber line interface circuit for interfacing communication signals supplied from a device, such as a modem, with a wireline pair for delivery to a remote circuit, such as a subscriber's telephone.

For this purpose, as shown in the sensing block circuit diagram of FIG. 3, the tip current sense resistor 21 may be installed in the closed loop, negative feedback path of a 'tip' path sense amplifier 23, which has its (−) input coupled through an input resistor 24 to the IN1− node and its output coupled to the IN1+ node. The current Iin1 through the tip current sense resistor 21 provides a voltage drop proportional to tip path current. This tip path representative voltage is supplied as a differential control voltage to a first, tip path differential coupling circuit 30 coupled between a first current source 41 (referenced to a power supply rail VEE) and the complementary polarity inputs 11, 12 of the operational amplifier 10.

Although the non-limiting circuit implementation of FIGS. 2 and 3 shows the differential coupling circuit configured as a differentially coupled pair of (NPN) bipolar transistors 50 and 60, it is to be understood that the invention is not limited thereto, but also may be configured of alternative equivalent circuit devices, such as field effect transistors (FETs), for example.

The current source 41 and an associated pair of bias resistors 54 and 64 for the tip path differential coupling circuit 30, plus like components of a second (ring path-associated) differential coupling circuit 35, establish the dynamic range of the transimpedance circuit. As a non-limiting example, these bias resistors (as well as additional bias and load resistors to be described) may have a value on the order of 50 Kohms. As will be described, the maximum current that can be sensed in each complementary (tip/ring) current flow path of the transimpedance circuit is limited by the product of the maximum bias current $I_{DIFF}$ supplied by the respective (tip and ring path) current sources 41 and 42 and the ratio of the value of one of the transistor emitter bias resistances $R_{DIFF}$ to the resistance value $R_{SENSE}$ of the (tip and ring path) sense resistors 21 and 22.

Since the current supplied by the current source 41 is based upon the dynamic range needs of the transimpedance circuit, and as these requirements will vary depending upon the mode of operation of the SLIC, by configuring the current source 41 as a controllable device, unwanted power dissipation can be minimized. For example, during the on-hook, quiescent mode (no circuit operation) of a subscriber's telephone, there is no need to draw any current; consequently during this mode, the output of the current source 41 can be reduced to zero, so that no power is consumed.

For on-hook, reduced power signal-monitoring mode, such as for the case of a phone having caller-ID class of service, only a very reduced or minimal current is necessary, so that power consumption can be reduced to a relatively small value. It is not until the phone is placed in its off-hook voice or AC signaling mode that the full dynamic range properties of the SLIC are required; for these latter conditions, the current output of the current source 41 can then be controllably increased to its maximum value.

The transistor 50 of the (tip side) differential coupling circuit 30 has its control terminal or base 51 coupled to the input node IN1−, and its collector 52 coupled to supply a first difference voltage $V_{DIFF-}$ to a load resistor 99 (having a value $R_{LOAD-}$) coupled to the non-inverting (+) input 11 of the operational amplifier 10. The emitter bias and thereby the operation of transistor 50 is established by coupling the emitter 53 of transistor 50 through a bias resistor 54 (having a value denoted $R_{DIFF1-}$) to the first current source 41, which supplies a first reference current $I_{DIFF1}$. As pointed out above, by configuring the current source 41 as a controllable device, the circuit's power consumption can be minimized.

In like manner, the other transistor 60 of the differentially coupled pair 50/60 has its control terminal/base 61 coupled to the input node IN1+, and its collector 62 coupled to supply a second difference voltage $V_{DIFF1+}$ to a load resistor 119 (having a value $R_{LOAD+}$) coupled to the inverting (−) input 12 of operational amplifier 10. Like transistor 50, the operation of the transistor 60 is established by coupling its emitter 63 through bias resistor 64 (having a value denoted $R_{DIFF1+}$) to the first current source 41.

For the complementary signaling (ring) path, a second 'ring' sense resistor 22 is coupled between input nodes IN2+ and IN2− of a second or ring current sense path Iin2. Like the tip path sense resistor 21, the ring path sense resistor 22 comprises a relatively small valued resistor (having a resistance value denoted $R_{SENSE2}$), which is very closely matched (within a small fraction of one percent) with the value of the tip sense resistor 21 for the purpose of providing the desired degree of common mode rejection (longitudinal balance) required of the SLIC.

As shown in FIG. 3, the ring path sense resistor 22 is installed in the closed loop negative feedback path of a 'ring' side sense amplifier 26, which has its (−) input coupled through an input resistor 28 to the IN2− node and its output coupled to the IN2+ node. Both the tip path sense amplifier 23 and the path ring sense amplifier 26 provide substantial performance in terms of gain and gain-bandwidth product. Therefore, with tip and ring sense resistors 21 and 22 installed in closed loop paths of their associated tip and ring sense amplifiers 24 and 26, any voltages dropped across the sense resistors 21 and 22 will appear as a negligibly small component of the voltage between the tip and ring terminals of the SLIC.

The voltage drop across the resistor 22 resulting from the ring current Iin2 flowing therethrough is applied as a differential control voltage to a second differential coupling circuit 35, connected in circuit between the second current source 42 and the complementary polarity inputs 11, 12 of the operational amplifier 10. As shown in FIG. 2, the direction of flow of the ring current Iin2 is assumed to be opposite to that of tip current Iin1. These currents contain a desirable differential current component $I_{DIFF}$ and an undesirable common mode component $I_{COM}$ to be rejected.

Like the first differential coupling circuit 30, the second differential coupling circuit 35 may comprise a differentially coupled bipolar transistor pair of NPN transistors 55 and 65. Transistor 55 has its base 56 coupled to the input node IN2−, and its collector 57 coupled to supply a difference voltage $V_{DIFF2-}$ to resistor 119 coupled to the (+) input 11 of the operational amplifier 10. Emitter bias for the transistor 55 is provided by coupling the emitter 58 through a bias resistor 59 (having a value denoted $R_{DIFF2-}$) to the second current source 42, also referenced to the voltage supply rail VEE, and supplying a second reference current $I_{DIFF2}$. In a like manner, transistor 65 has its control terminal/base 66 coupled to the input node IN2+, and its collector 67 coupled to supply a difference voltage $V_{DIFF2+}$ to resistor 99 coupled to the (−) input 12 of the operational amplifier 10. The operation of the transistor 65 is established by biasing its emitter 68 through bias resistor 69 (having a value denoted $R_{DIFF2+}$) to the second current source 42.

In addition to differentially sensing complementary tip and ring currents Iin1 and Iin2 flowing through the complementary (tip and ring) paths' sensing resistors 21 and 22 and their associated differential coupling circuits 30 and 35, the input terminals 11 and 12 of the operational amplifier 10 are further coupled to a differentially configured, linearity compensator circuit 70, which is coupled in circuit with voltage supply rails VEE and VCC, and provides sufficient overhead voltages in the presence of worst case voltage swing conditions.

For this purpose, the linearity compensator circuit 70 has a differential amplifier configuration, which is coupled to close a negative feedback loop from the output 13 to the (−) input 11 of the operational amplifier 10, relative to reference voltage balancing path coupled to the amplifier's non-inverting (+) input 11. This balanced coupling configuration forces the bottom terminals of load resistors 99 and 119 of the linearity compensator circuit 70 to the same potential, thereby equalizing the voltage inputs of the operational amplifier 10 irrespective of variations in the sensed tip and ring currents.

A first (+) differential compensator portion of the linearity compensator 70 comprises a first (PNP) emitter-follower 'overhead' transistor 80 having its collector-emitter path coupled in circuit with a first bias current source 85 (referenced to the VCC voltage supply rail) and the supply rail VEE. The first bias current source 85 generates a bias current $I_{BIAS1}$. The first overhead transistor 80 has its control node or base 81 coupled to a reference voltage node 71. The voltage at the reference voltage node 71 is established by a voltage drop across a resistor 75 (having a resistance value $_{ROVHD1}$) relative to a voltage node, such as ground (GND), as a result of a prescribed overhead current $I_{OVDH1}$ therethrough as supplied by a current course 76, referenced to the VCC supply rail.

The emitter 83 of the first overhead transistor 80 is coupled to the base 91 of an emitter-follower NPN transistor 90 of an emitter-follower configured compensator (COMP−) transistor pair 90/95. The collector 92 of the transistor 90 and the collector 97 of transistor 95 are coupled to the VCC supply rail. The emitter 98 of the transistor 95 is coupled through the load resistor 99 to the (+) input 11 of the operational amplifier 10. The respective resistance values $R_{LOAD-}$ and $R_{LOAD+}$ PG of load resistor 99 and load resistor 119 are the same, denoted as the resistance value $R_{LOAD}$. As noted above, like the bias resistors, the load resistors may have a value $R_{LOAD}$ on the order of 50 Kohms.

To close the negative feedback loop of the operational amplifier 10, a second (−) differential compensator portion of the linearity compensator 70 includes a second (PNP) emitter-follower 'overhead' transistor 100 having its base 101 coupled to a feedback voltage node 72. The voltage feedback node 72 is coupled through a feedback resistor 77 (having a resistance value $R_{OVHD2}$) to the voltage node 4 to which the output 13 of the operational amplifier 10 is coupled. A reference current course 78 is coupled to supply an overhead current $I_{OVDH2}$ to the node 72 and thereby to the feedback resistor 77. Overhead transistor 100 has its emitter-collector current path coupled in circuit with bias current source 105, referenced to the VCC voltage supply rail, and the supply rail VEE, and being operative to generate a second bias current $I_{BIAS2}$.

The second overhead transistor 100 has its emitter 103 coupled to the base 111 of an emitter-follower NPN transistor 110 of an emitter-follower configured compensator (COMP+) transistor pair 110/115. The emitter 113 of transistor 110 is coupled to the base 116 of transistor 110. The collector 112 of transistor 110 and the collector 117 of transistor 115 are coupled to the VCC supply rail. The emitter 118 of emitter-follower transistor 115 is coupled through load resistor 119 to the (−) input 12 of operational amplifier 10.

The transimpedance circuit of FIGS. 2 and 3 operates as follows. The complementary tip and ring currents Iin1 and Iin2 assumed to be flowing in the directions shown through the respective tip and ring sense resistors 21 and 22 may be defined in equations (1) and (2) as:

$$Iin1 = I_{DIFF} + I_{COM} \quad (1).$$

$$Iin2 = I_{DIFF} - I_{COM} \quad (2).$$

Since the linearity compensator 70 is coupled in a differential configuration between nodes 71 and 72, a differential overhead voltage $\Delta V_{OVHDem}$ representative of the difference between the emitter voltages of the emitter-follower transistors 80 and 100 will be applied to the bases 91/111 of COMP transistors 90/110. Denoting the base-emitter voltage as Vbe, this differential overhead voltage may be defined in equation (3) as:

$$\Delta V_{OHDem} = Vbe_{110(COMP+)} + Vbe_{115(COMP+)} + I_{RLOAD119} * R_{LOAD119} - I_{RLOAD99} * R_{LOAD99} - Vbe_{90(COMP-)} - Vbe_{95(COMP-)} \quad (3).$$

However, the load current $I_{RLOAD-}$ through the load resistor 99 of the (+) leg of the linearity compensator 70 effectively corresponds to the sum of the differential currents $I_{RDIFF1-}$ and $I_{RDIFF2-}$ through bias resistors 59 and 54, respectively. Namely, $$I_{RLOAD99} = I_{RLOAD-} = \alpha_N(I_{RDIFF1-} + I_{RDIFF2-}) \quad (4),$$

where $\alpha N$ is a proportionality constant which, for practical purposes is equal to 1.0.

Similarly, a load current $I_{RLOAD+}$ through the (−) compensator leg load resistor 119 effectively corresponds to the sum of the differential currents $I_{RDIFF1+}$ and $I_{RDIFF2+}$ through the bias resistors 69 and 64, respectively. Namely, $$I_{LOAD119} = I_{RLOAD+} = I_{RDIFF1+} + I_{RDIFF2+} \quad (5).$$

In addition, the voltage drop $V_{SENSE1}$ across the first (tip) sense resistor 21 may be expressed as:

$$V_{SENSE1} = Iin1 * R_{SENSE1} = Vbe_{60(DIFF1+)} + (I_{RDIFF1+}) * (R_{DIFF1+}) - (I_{RDIFF1-}) * (R_{DIFF1-}) - Vbe_{50(DIFF1-)} \quad (6).$$

The voltage drop $V_{SENSE2}$ across the ring sense resistor 22 may be expressed as:

$$V_{SENSE2} = Iin2 * R_{SENSE2} = Vbe_{65(DIFF2+)} + (I_{RDIFF2+}) * (R_{DIFF2+}) - (I_{RDIFF2-}) * (R_{DIFF2-}) - Vbe_{55(DIFF2-)} \quad (7).$$

Substituting equations (4) and (5) into equation (3) yields:

$$\Delta V_{OVHDem} = (I_{RDIFF1+} + I_{RDIFF2+}) * (R_{LOAD119}) - (I_{RDIFF1-} + I_{RDIFF2-}) * (R_{LOAD99}) - Vbe_{90(COMP-)} + Vbe_{110(COMP+)} - Vbe_{95(COMP-)} + Vbe_{115(COMP+)} \quad (8).$$

Adding equations (6) and (7) yields:

$$Iin1 * R_{SENSE1} + Iin2 * R_{SENSE2} = (I_{RDIFF1+}) * (R_{DIFF1+}) + (I_{RDIFF2+}) * (R_{DIFF2+}) - (I_{RDIFF1-}) * (R_{DIFF1-}) - (I_{RDIFF2-}) * (R_{DIFF2-}) - Vbe_{55(DIFF2-)} - Vbe_{50(DIFF1-)} + Vbe_{65(DIFF2+)} + Vbe_{60(DIFF1+)} \quad (9)$$

Subtracting equation (9) from equation (8) and letting $R_{LOAD99} = R_{LOAD-}$ and $R_{LOAD119} = R_{LOAD}$ yields:

$$\Delta V_{OVHDem} - (Iin1 * R_{SENSE1} + Iin2 * R_{SENSE2}) = (I_{RDIFF1+}) * (R_{LOAD+} - R_{DIFF1-}) + (I_{RDIFF2+}) * (R_{LOAD+} - R_{DIFF2+}) - (I_{RDIFF1-}) * (R_{LOAD-} - R_{DIFF1-}) -$$

$$(I_{RDIFF2-}) * (R_{LOAD-} - R_{DIFF2-}) + [(Vbe_{110(COMP+)} - Vbe_{90(COMP-)}) + [(Vbe_{55(DIFF2-)} + Vbe_{50(DIFF1-)})] + [(Vbe_{115(COMP+)} - Vbe_{95(COMP-)}) - [(Vbe_{65(DIFF2+)} + Vbe_{60(DIFF1+)})] \quad (10).$$

This relationship may be alternatively expressed as:

$$\Delta V_{OHDem} - (Iin1 * R_{SENSE1} + Iin2 * R_{SENSE2}) = (I_{RDIFF1+}) * (R_{LOAD+} - R_{DIFF1-}) + (I_{RDIFF2+}) * (R_{LOAD+} - R_{DIFF2+}) - (I_{RDIFF1-}) * (R_{LOAD-} - R_{DIFF1-}) -$$

$$(I_{RDIFF2-}) * (R_{LOAD-} - R_{DIFF2-}) + (kT/q) * \ln [\{(I_{RDIFF1+} + I_{RDIFF2+})/(R_{DIFF1-} - I_{RDIFF2-})\}^2 * (I_{RDIFF1-}/I_{RDIFF1+}) * (I_{RDIFF2-}/I_{RDIFF2+})], \quad (11)$$

(where k is Boltzman's constant, T is absolute temperature, and q is the electron charge).

Assuming that the betas of transistors 95 and 115 are well matched, the logarithmic portion of equation (11) may be rewritten as:

$$(kT/q) * \ln [\{(I_{RDIFF1+} + I_{RDIFF2+})/(I_{RDIFF1+})\} * \{(I_{RDIFF1+} + I_{RDIFF2+})/(I_{RDIFF2+})\} * \{(I_{RDIFF1-}/I_{RDIFF1-} + I_{RDIFF2-})\} * \{(I_{RDIFF2-}/I_{RDIFF1-} + I_{RDIFF2-})\}], \quad (12)$$

or in expression (13) as:

$$(kT/q) * \ln [\{1 + \Delta I_{21+}/I_{RDIFF1+}) + (\frac{1}{4}) * (\Delta I_{21+}/I_{RDIFF1+})^2\} * \{1 + \Delta I_{21-}/I_{RDIFF1-}\} * \{1 + \Delta I_{21-}/I_{RDIFF1-}\} +$$

$$(\frac{1}{4}) * (\Delta I_{21-}/I_{RDIFF1-})^2\}^{-1} * \{1 + \Delta I_{21+}/I_{RDIFF1+}\}^{-1}], \quad (13)$$

where $I_{DIFF2+} = I_{DIFF1+} + \Delta I_{21+}$, and $$I_{DIFF2-} = I_{DIFF1-} + \Delta I_{21-}.$$

For any practical conditions encountered in real applications, both quadratic terms found in equation (13) are negligible. This reduces expression (13) to:

$$(kT/q) * \ln [\{1 + \Delta I_{21+}/I_{RDIFF1+}\} * \{1 + \Delta I_{21-}/I_{RDIFF1-}\} * \{1 + \Delta I_{21-}/I_{RDIFF1-}\}^{-1} * \{1 + \Delta I_{21+}/I_{RDIFF1+}\}^{-1}], \quad (14)$$

which yields $(kT/q) * \ln [1] = 0$. (15)

Matching the bias resistors, so that $R_{DIFF1+} = R_{DIFF1-} = R_{DIFF2+} = R_{DIFF2-} = R_{LOAD}$, and substituting in equation (11) yields:

$$\Delta V_{OHDem} = Iin1 * R_{SENSE1} + Iin2 * R_{SENSE2} \quad (16).$$

If $R_{SENSE1} = R_{SENSE1} = R_{SENSE}$ (17), then $$\Delta V_{OHDem} = (Iin1 + Iin2) * R_{SENSE} \quad (18).$$

Substitution of equations (1) and (2) into equation (18) yields:

$$\Delta V_{OHDem} = 2 * I_{DIFF} * R_{SENSE}, \quad (19)$$

which lacks any contribution form the undesirable longitudinal components in equations (1) and (2).

An examination of the circuit of FIG. 2 reveals that the voltage V1 at the single ended voltage node 4 may be defined as:

$$V1 = I_{OVHD1} * (R75 = R_{OVHD1}) + Vbe_{80(OVHD1)} + \Delta V_{OHDem} - Vbe_{100(VOHD2)} - I_{OVHD2} * (R77 = R_{OVHD2}) \quad (20).$$

Again by matching circuit parameters, in particular, by making $R_{75} = R_{77}$; $I_{OVHD1} = I_{OVHD2}$; $I_{BIAS1} = I_{BIAS2}$; and using equal geometries for the overhead transistors 80 and 100 (which is readily accomplished by placing these transistors immediately adjacent to each other using present day semiconductor processing), equation (20) reduces to:

$$V1 = \Delta V_{OHDem} \quad (21).$$

Namely, the voltage V1 produced at single ended voltage node 4 is relatively simply and linearly definable in terms of the sensed current $I_{DIFF}$ and the values of the tip and ring sense resistors $R_{SENSE}$. In particular, $$V1 = 2 * I_{DIFF} * R_{SENSE} \quad (22).$$

It may be noted that reversing the direction of the input currents Iin1 and Iin2 being sensed simply reverses the polarity of the voltage V1 at voltage node 4.

Equation (22) implies that if either of the two sensed tip and ring currents Iin1 or Iin2 is flowing in a direction opposite to that shown in FIG. 2 and both currents have the same value, the resulting voltage V1 in equation (22) approaches zero. Namely, by optimizing the match between the resistance value $R_{SENSE}$ of the sense resistors 21 and 22 (e.g., 20 ohms each), and the values of each resistance value $R_{DIFF}$ of the bias resistors 54, 59, 64, 69 (e.g., 50 ohms each), common mode output error is minimized.

Because the currents flowing through the transimpedance stage are defined only by its current sources, and primarily because of their relative values, which may be denoted as $I_{TIP\_L\_H}$ and $I_{RING\_L\_H}$, the reduction in power consumption relative to other methods can be substantial. The two current sources 41 and 42 are responsible for defining the sensing dynamic range of the transimpedance stage.

As a consequence, it is particularly useful to be able to vary the values for the currents $I_{DIFF1}$ and $I_{DIFF2}$ supplied by the current sources 41 and 42 depending upon mode of operation of the circuit. 1—For open circuit mode, in which the subscriber's phone is disconnected, a value of zero may be chosen. 2—For stand-by mode, where the subscriber is in the process of going off hook and placing a call, the current may have a very low value for the purpose of activating the DC loop. 3—For the condition that the phone is on-hook, yet the SLIC is active (for the purpose of monitoring the line for a data transmission, such as caller ID), a low current value may also be used. 4—Where the phone is off-hook and the SLIC is in its active call mode, the current may be increased to its maximum value. These four modes of operation require different dynamic ranges for sensing the currents in the loop, and the minimum possible setting for $I_{TIP\_L\_H}$ and $I_{RING\_L\_H}$ can be readily calculated from the above equations (25), (26) and (27).

Being able to controllably reduce power consumption based upon the mode of operation is effectively impossible using a conventional differentially connected operational amplifier. Indeed, for the off-hook mode, over ten megohms of resistance would be required to achieve an equivalent reduction in power dissipation. In such a case, however, such a very large value of resistance introduces an intolerable amount of thermal noise and causes the functionality of the operational amplifier to depart from its designed characteristic, making the use of extremely large resistances untenable.

It should also be noted that the DC accuracy of the voltage V1 realized by the transimpedance circuit of FIG. 2 is over an order of magnitude better than the conventional approach, for equal tolerances in the matching of the critical sets of resistors (not including the tip and ring sense resistors 21 and 22, which have the same resistance value $R_{SENSE}$. This substantially improved accuracy is due to the fact that the ring terminal is expected to have a DC voltage in excess of 40 volts during the on-hook stage of the subscriber's phone. This large voltage propagates directly to the output of a conventional circuit by an amount dictated by the mismatch of the resistors connected to the ring terminal. In the transimpedance stage of FIG. 2, corresponding errors are very significantly attenuated by the properties of the transistors 55 and 65 of ring path-associated differential coupling circuit 35.

As mentioned above, the purpose of the bias and overhead components is to ensure sufficient voltage 'headroom' to accommodate worst case voltage swing conditions and the lowest value of Vcc. Currents $I_{OVDH1}$ and $I_{OVDH2}$ as supplied by respective current sources 76 and 78 are programmed to different values in accordance with whether the SLIC is used in forward or reverse mode. In forward mode, the value of V1 is expected to be greater than or equal to zero. However, in the reverse mode, the value of V1 is expected to be less than or equal to zero.

Since the voltage V1 produced by the transimpedance stage 1 has both a DC component and an AC component, then from equation (22), V1 may be expressed as:

$$V1 = 2R_{SENSE}*I_{DIFFDC} + 2R_{SENSE}*I_{DIFFAC} \quad (23).$$

As will be described, the filter/gain output stage 2, to which the voltage V1 is coupled, is operative to separate the respective DC and AC components of the precision voltage V1, so as to make the DC component $V1_{DC}$ available for processing by the DC loop (not shown), while the AC component $V1_{AC}$ propagates through the transmission channel and is amplified by a prescribed gain factor for application to a transmission output terminal.

Figure 4:
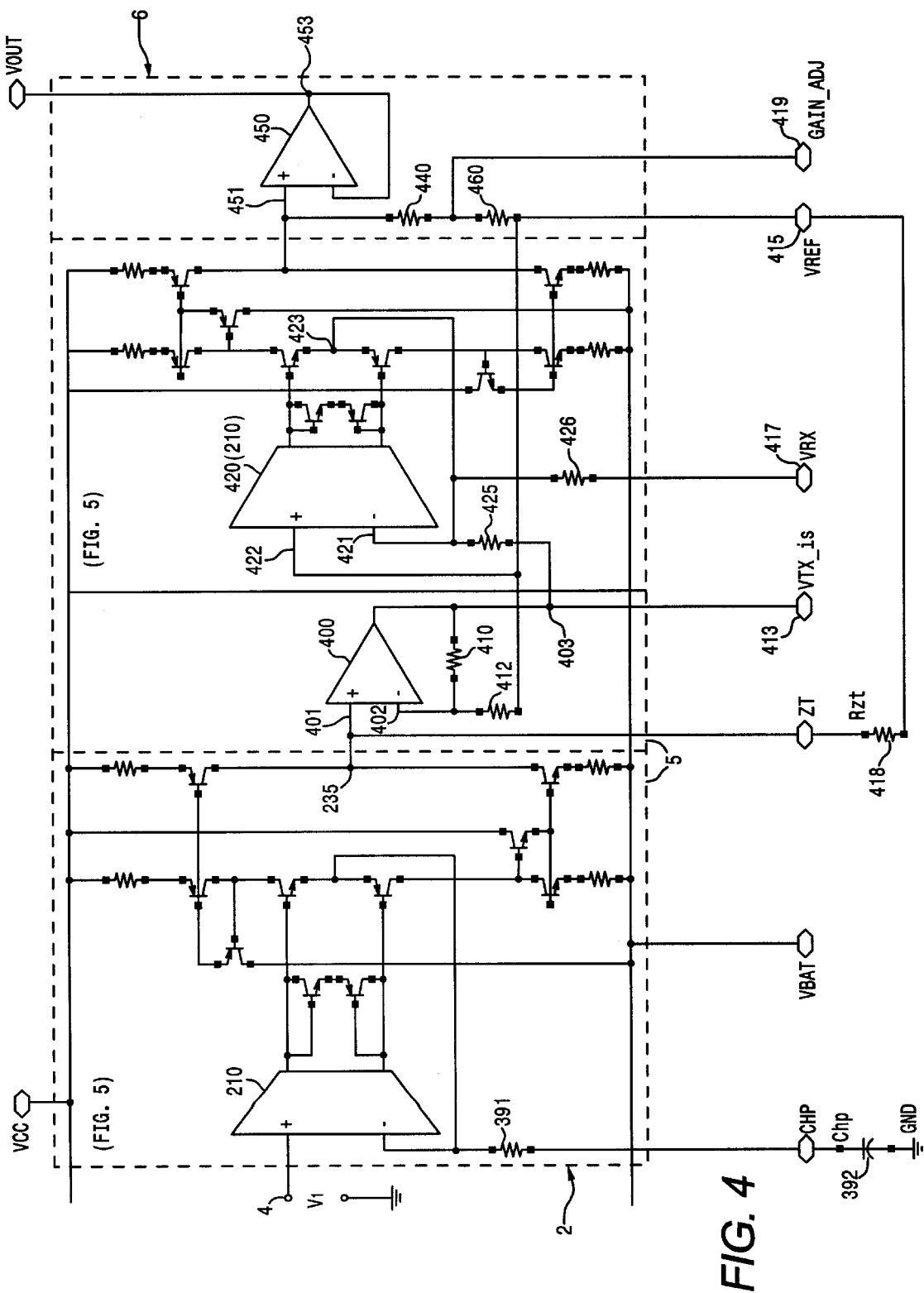
FIG. 4 illustrates the architecture of the transconductance amplifier-based filter/gain output stage of the transmission channel of FIG. 1.

For this purpose, and as diagrammatically illustrated in FIG. 4, the filter/gain output stage 2 includes a filter/gain section 5 that is coupled to an output/gain section 6. Each of these sections incorporates a transconductance amplifier circuit of the type disclosed in the above-referenced '408 application, and diagrammatically illustrated in FIG. 5.

Figure 5:
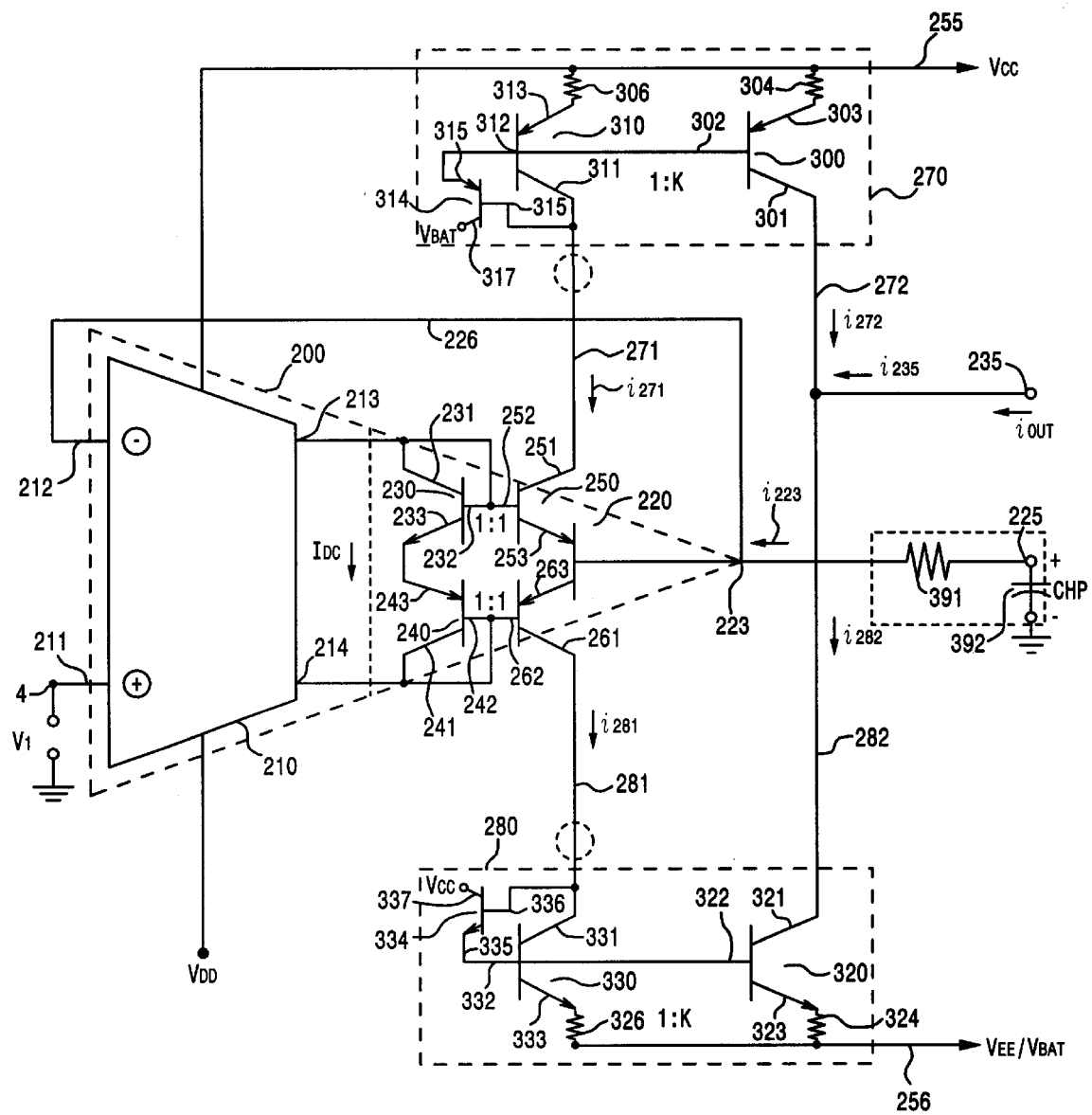
FIG. 5 shows the circuit configuration of a respective transconductance amplifier stage employed in respective filter/gain and output/gain sections of the filter/gain output stage of FIG. 4.

As in the case of the transimpedance stage of FIGS. 2 and 3, although the transconductance amplifier circuit of FIG. 5 is shown as being implemented with bipolar devices, it is to be understood that it may alternatively be implemented using equivalent components, such as, but not limited to field effect transistors (FETs). The transconductance amplifier circuit is shown in broken lines 200, and includes an operational amplifier configured as a unity gain buffer.

This operational amplifier has a dual polarity input operational amplifier input and gain stage 210, and a low output impedance, single ended output stage 220. The input stage 210, which may have a conventional high impedance, moderate voltage gain circuit configuration, has a first, non-inverting polarity (+) input 211, that is adapted to be coupled to track the input voltage V1 (referenced to a DC voltage (which may be ground (GND)), as supplied to node 4 from the upstream transimpedance stage 1. A second, inverting polarity (−) input 212 of the input stage 210 is coupled to via a negative feedback path 226 to an input/output node 223, to which a high pass filter network 390 formed by a resistor 391 and a capacitor 392, referenced to ground, is coupled.

The output stage 220 of the transconductance amplifier circuit 200 includes a differentially coupled transistor circuit pair, having a first, diode-connected NPN transistor 230, whose collector 231 and base 232 are connected in common to a first polarity output port 213 of the amplifier's input stage 210. The emitter 233 of transistor 230 is coupled in common to the emitter 243 of a second, diode-connected PNP transistor 240. In a complementary fashion, the diode-connected PNP transistor 240 has its collector 241 and base 242 connected in common to a second polarity output port 214 of the amplifier input stage 210. The base 232 of NPN transistor 230 is coupled in common with the base 252 of an NPN transistor 250, the emitter 253 of which is coupled in common to the emitter 263 of a PNP transistor 260 and to an input/output node 223 of the output stage 220. The PNP transistor 260 has its base 262 coupled in common with the base 242 of the diode-connected PNP transistor 240. As noted above, the output stage's input/output node 223 is coupled over the negative feedback path 226 to the inverting input 212 of the input stage 210.

The series-connected, collector-emitter current paths through the output transistors 250 and 260 of the transconductance amplifier's output stage 220, rather than being biased via a direct coupling to respective (Vcc and VBAT/Vee) voltage supply rails 255 and 265, are coupled in circuit with first current supply paths 271 and 281 of first and second current mirror circuits 270 and 280, respectively. These current mirror circuits serve to produce an accurate output current at a single ended output port 235 independently of the voltage at which output port 235 is biased.

The current mirror circuit 270 includes a first PNP transistor 300 having its emitter 303 coupled through resistor 304 to the (Vcc) voltage supply rail 255, and its base 302 coupled in common with the base 312 and collector 311 of a diode-connected current mirror PNP transistor 310, whose emitter 313 is coupled through resistor 306 to the (Vcc) voltage supply rail 255. The current mirror transistor 300 supplies a mirrored output current to the current supply path 272 as a prescribed factor K of the current received by transistor 310 over the current supply path 271, in accordance with the ratio (1:K) of the geometries of the transistors 310/300 and resistors 304/306. The base 312 of transistor 310 is coupled to the emitter 315 of a further PNP transistor 314, the collector 317 of which is coupled to VBAT and the base 316 of which is coupled to the collector 311 of transistor 310. The collector 311 of transistor 310 and the base 316 of transistor 314 are coupled over the first current supply path 271 of the current mirror 270 to the collector 251 of transistor 250 of the output stage 220. The collector 301 of transistor 300 is coupled over the second current supply path 272 of the current mirror 270 to the output port 235.

In a complementary manner, the current mirror circuit 280 includes a first NPN transistor 320 having its emitter 323 coupled through resistor 324 to the (VBAT/Vee) voltage supply rail 256 and its base 322 coupled in common with the base 332 of current mirror NPN transistor 330, whose emitter 333 is coupled through resistor 326 to (Vee/VBAT) voltage supply rail 256. The collector 331 of transistor 330 is coupled to the base 336 of an NPN transistor 334, the collector 337 of which is coupled to Vcc, and the emitter 335 of which is coupled to the base 332 of transistor 330. The collector 331 of transistor 330 and base 336 of transistor 334 are coupled over the first current supply path 281 of the current mirror 280 to the collector 261 of output stage transistor 260. The collector 321 of transistor 320 is coupled over a second current supply path 282 of the current mirror 280 to the output node 135. The current mirror transistor 320 provides a mirrored output current to current supply path 282 as a factor K of the current received by transistor 330 over current supply path 281, in accordance with the (1:K) ratio of the geometries of transistors 330/320 and resistors 324/326.

As described in the above-referenced '408 application, current node equations that define the transfer function of the transconductance amplifier circuit of FIG. 5 reveal that the circuit has a very wide dynamic range that accommodates multiple, differential polarity voltages applied at a voltage feed port 225 which, in the current embodiment, is coupled to the common connection of resistor 391 and capacitor 392 of the filter 390. This wide dynamic range is obtained at a very low quiescent power dissipation.

More particularly, the output current $i_{223}$ delivered to input/output node 223 may be defined in equation (24) as:

$$i_{223} = v_1/z_{390}. \quad (24)$$

The currents $i_{271}$ and $i_{281}$ supplied to the current mirrors 270 and 280 may be related to the current $i_{223}$ at the input/output node 223 as:

$$i_{223}+i_{271}=i_{281} ==> i_{223}=i_{281}-i_{271} \quad (25)$$

The currents $i_{272}$ and $i_{282}$ supplied by current mirrors 270 and 280 may be related to the current $i_{235}$ at the output port 235 as;

$$i_{272}+i_{235}=i_{282} \quad (26)$$

and equation (27) as:

$$Ki_{271}+i_{235}=Ki_{281} => i_{out}=i_{235}=K(i_{281}-i_{271})=Ki_{223} \quad (27).$$

Substituting equation (24) into equation (27) yields equation (28) as:

$$i_{out}=V1/z_{390}. \quad (28)$$

Implicit in equations (42) and (44) is the fact that transistor limitations due to beta and early voltage are compensated or minimized (in a manner not specifically shown in the diagrammatic illustration of FIG. 5). It may also be noted that if the transistors 230/250 and 240/260 are matched pairs and since the time average value of the voltage at terminal 225 equals the time average of the voltage V1, then the time average values of currents $i_{271}$ and $i_{281}$ are equal to the quiescent DC bias current $I_{DC}$ flowing in the emitter path of the output stage transistors 230–240. Therefore, if the value of the bias current $I_{DC}$ is relatively low and the current mirror ratio K is equal to or less than 1.0, the quiescent power consumed by the transconductance amplifier circuit of FIG. 5 can be reduced to a very small value.

As noted above, the output node 223 of the transconductance stage 200 of FIG. 5 is tied to its inverting polarity input 212, SO that in the filter/gain section 5 of FIG. 4, the voltage at the top terminal of resistor 391 (having a value RHP), which is coupled to GND through capacitor 392 (having a value CHP), is equal to the single ended voltage V1 supplied from the transimpedance stage to node 4. As pointed out above, the resistor 391 and capacitor 392 form a high pass filter 390 for the filter/gain stage 5.

In the frequency domain, the steady state current $I_{RHP}$ may be defined as:

$$I_{RHP}=V1_{AC}/(R_{HP}+(1/j\omega*C_{HP})=j\omega*C_{HP}/(1+j\omega*R_{HP}C_{HP})V1_{AC} \quad (29).$$

It may also be observed that the steady state voltage across the capacitor 392 is equal to $V1_{DC}$, so that $$V_{CHP}=2R_{SENSE}*I_{DIFFDC} \quad (30),$$

which is used as an input to the SLIC DC loop (not shown), as described previously.

If the value $R_{HP}$ of the resistor 391 and the value $C_{HP}$ of the capacitor 392 of the high pass filter 390 are appropriately selected such that $w*R_{HP}C_{HP}>>1$ in the frequency range of interest, then $$I_{RHP}=V1_{AC}/R_{HP}=(2R_{SENSE}/R_{HP})*I_{DIFFAC} \quad (31).$$

From the above discussed properties imparted to the transconductance amplifier circuit of FIG. 5 by virtue of the current mirror connections with the series connected, collector-emitter current paths through the output transistors 250 and 260 of the transconductance amplifier's output stage 220 and, assuming K=1, the current $I_{RHP}$ is equal to the current $I_{ZT}$ at the output port 235.

Therefore, the voltage $V_{ZT}$ at the output port 235 may defined as:

$$V_{ZT}=(2R_{SENSE}/R_{HP})*(R_{ZT}I_{DIFFAC}) \quad (32).$$

As shown in FIG. 4, the voltage $V_{ZT}$ at the output port 235 is coupled to the non-inverting (+) input 401 of an operational amplifier 400, which is connected in a non-inverting configuration with a closed loop gain $(1+R_{410}/R_{412})$ defined by the ratio of a feedback resistor 410 coupled between amplifier output node 403 and an inverting (−) input 402, and an input resistor 412 coupled to the operational amplifier's inverting input 402 from a voltage reference VREF terminal 415. A current-sense (is) based transmission output voltage VTX_is is at output node 403 of amplifier 400 and coupled to a transmission terminal 413, relative to the voltage reference terminal 415 to which a reference voltage $V_{REF}$ is applied, may be defined as:

$$VTX\_is = (2(1+R_{410}/R_{412})R_{SENSE}/R_{HP})*(R_{ZT}I_{DIFFAC}) \quad (33).$$

Although the reference voltage terminal 415 is shown as being coupled to receive an arbitrary reference voltage $V_{REF}$, for the purpose of illustrating supply DSP codes, for simplification, the reference voltage will be assumed to be ground potential (GND).

An external resistor 418 having a value $R_{ZT}$ is used to program the gain of the filter/gain section 5. The value $R_{ZT}$ is chosen to be equal to:

$$Zo/(2(1+R_{410}/R_{412})R_{SENSE}/R_{HP}) \quad (34),$$

so that $VTX\_is = ZoI_{DIFFAC}$ \quad (35), where Zo is the characteristic impedance of the line being driven by the tip and ring terminals of the SLIC.

In those cases where the reflection characteristics of the current-sense, voltage-feed architecture of the transmission channel of FIG. 1 are acceptable, the (VTX_is) output node 413 may be employed as the transmitting terminal of the SLIC, with its output fed back to the receiver for impedance synthesis, making output/gain section 6 is unnecessary. However, when compatibility with current-feed, voltage-sense circuits is required in terms of DSP CODEC programming, the output/gain section 6 is employed.

When the transmission voltage VTX_is of equation (35) is fed back to the receiver, feedback gain is used to synthesize the characteristic impedance Zo as the termination impedance between the tip and ring terminals of the SLIC. Therefore, for a signal $v_{rx}$ applied to a receiver (VRX) terminal 417, the corresponding voltage signal $v_{tr}$ between the tip and ring terminals may be defined as:

$$v_{tr} = -2v_{rx}*Z_L/(Z_L+Zo) \quad (36),$$

where $Z_L$ is the actual impedance of the line. (The negative sign in equation (36) is due to the use of negative feedback in the AC loop.) Ideally, $Zo=Z_L$, in which case $v_{tr}=-v_{rx}$. However, this is not necessarily the case.

In terms of a voltage-sense (vs), current-feed architecture, the signal reflected at the (VTX) transmission terminal 413 effectively corresponds to the voltage $v_{tr}$, set forth in equation (36). Namely, $$v_{tx\_vs} = v_{tr\_vs} = -2V_{rx}*Z_L/(Z_L+Zo) \quad (37).$$

For such an architecture, the response from $v_{rx}$ to $v_{tr}$ (corresponding to the response G6 from the output/gain section 6 may be defined as:

$$G6_{vs} = v_{tx\_vs}/v_{rx} = -2Z_L/(Z_L+Zo) \quad (38).$$

For the current-sense (is), voltage-feed sense architecture of the transmission channel of FIG. 1, equation (35) still applies, since the termination impedance Zo is synthesized. However, since this architecture is configured to sense (tip/ring) current, then $$v_{tx\_is} = ZoI_{DIFFAC} = Zo(-2v_{rx}*Z_L/(Z_L+Zo)*1/Z_L) \quad (39),$$

or $$v_{tx\_is} = -2v_{rx}*Zo/(Z_L+Zo) \quad (40).$$

As shown in FIG. 4, the output/gain section 6 is configured similar to the filter/gain section, and contains a transconductance amplifier 420 configured as shown in FIG. 5 described above, and having its inverting (−) input 421 coupled through an input resistor 425 to the output node 403 of operational amplifier 400. The non-inverting (+) input 422 of transconductance amplifier 420 is coupled to the $V_{REF}$ terminal 415, which may be at ground (GND) potential, as described above.

The respective transmission voltage $v_{tx\_is}$ and receiver voltage $v_{rx}$ signals are coupled to the output 423 of the transconductance amplifier 420 through respective resistors 425 and 426, having respective values $R_{425}$ and $R_{426}$. Based upon the properties of the transconductance amplifier circuit discussed above with reference to FIG. 5, the current $i_{R451}$ through an input resistor 440 to the non-inverting (+) input 451 of an output amplifier 450, which is configured as a unity-gain follower, may be defined as:

$$i_{R451} = v_{tx\_is}/R_{425} + v_{rx}/R_{426} \quad (41).$$

The resistor 440 is coupled in series with a resistor 460 to the reference voltage terminal 415 which, as noted above, is assumed to be coupled to ground potential. A gain adjust terminal 419 is coupled to the common connection of resistors 440 and 460.

Thus, the (voltage-sense) output voltage $v_{tx\_vs}$ (relative to $V_{REF}$) at the output node 453 of the output amplifier 450 may be defined as:

$$v_{tx\_vs} = i_{R440}*(R_{440}+R_{460}) = -i_{R451}*(R_{440}+R_{460}), \quad (42)$$

or, substituting equation (42) into equation (41)

$$v_{tx\_vs} = -(v_{tx\_is}/R_{425} + v_{rx}/R_{426})*(R_{440}+R_{460}) \quad (43).$$

Substituting equation (40) into equation (43) yields $$v_{tx\_vs} = -((-2v_{rx}Zo/(Zo+Z_L))*(1/R_{425}) + v_{rx}/R_{426})*(R_{440}+R_{460})) \quad (44).$$

Letting $R_{426} = R_{440} = R_{460} = R_{425}/2$, equation (44) becomes $$v_{tx\_vs} = -(-v_{rx}Zo/(Zo+Z_L) + v_{rx})*2 = -2v_{rx}(Zo+Z_L+Zo)/(Z_L+Zo), \quad (45)$$

or $$v_{tx\_vs} = -2v_{rx}Z_L/(Zo+Z_L) \quad (46).$$

For applications that require an attenuation of 6 dB at the transmission $V_{OUT}$ terminal 453, and with equal valued resistors 440 and 460, as described above, the resistor 460 may be shorted out by connecting a wire between terminals 415 and 419, so as to cut the series resistance in half and provide the desired transfer function. No other adjustments are required since the output/gain section 6 is outside the SLIC's closed loop.

It may also be observed that the transconductance amplifier configurations of the filter/gain section 5 and the output/gain section 6 provide a large dynamic signal range with very little quiescent power dissipation, as a result of the biasing of the output transistors in the transconductance amplifier stages, which also define their associated current mirrors.

As will be appreciated from the foregoing description, the transmission channel of the present invention is operative to operative to transform differentially sensed tip and ring input currents of a telecommunication wireline pair into a precise, single ended voltage, which is converted by a transconductance amplifier-based filter/gain output stage into a very precise, single ended output current, and output as a single ended output voltage for application to current-sense, voltage-feed or voltage-sense, voltage feed circuitry.

Advantageously, the output impedance which the transmission channel presents to the line is programmable by means of a single programming pin.

While I have shown and described several embodiments of the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed is:

1. A transmission channel for a subscriber line interface circuit comprising:
  a current-sensing transimpedance stage, having tip and ring ports adapted to be coupled to tip and ring paths of a telecommunication wireline pair, and being operative to transform differentially sensed tip and ring input currents of said telecommunication wireline pair into a single ended voltage; and
  a transconductance amplifier gain stage coupled to receive said single ended voltage output by said current-sensing transimpedance stage, and being operative to produce an output voltage for application to downstream voltage-fed circuitry, wherein said transimpedance stage includes an operational amplifier having first and second complementary polarity inputs and an output;
  a tip path sense resistor coupled to said tip port;
  a first differential coupling circuit coupled between said tip path sense resistor and said first and second complementary polarity inputs of said operational amplifier, and being operative to apply a first differential input current to said first and second complementary polarity inputs of said operational amplifier in accordance with a first voltage across said tip path sense resistor;
  a ring path sense resistor coupled to said ring port;
  a second differential coupling circuit coupled between said ring path sense resistor and said first and second complementary polarity inputs of said operational amplifier, and being operative to apply a second differential input current to said first and second complementary polarity inputs of said operational amplifier in accordance with a second voltage across said ring path sense resistor; and
  a linearity compensator circuit coupled between a supply voltage node and said first and second complementary polarity inputs of said operational amplifier, and being operative to close a negative feedback path from said output of said operational amplifier to said first input of said operational amplifier, relative to a voltage balancing path coupled to said second input of said operational amplifier, and equalize voltages applied thereby to said first and second complementary polarity inputs of said operational amplifier, irrespective of variations in currents through said tip path and ring path sense resistors.

2. A transmission channel according to claim 1, wherein said transconductance amplifier gain stage is configured to present a programmable output impedance to said downstream voltage-fed circuitry.

3. A transmission channel according to claim 2, wherein said transconductance amplifier gain stage is configured to be coupled to an external impedance for programming said output impedance presented to said downstream voltage-fed circuitry.

4. A transmission channel according to claim 1, wherein said transconductance amplifier gain stage includes a first transconductance amplifier circuit coupled in circuit with a first gain amplifier from which said output voltage is available for application to current-sense, voltage-fed circuitry.

5. A transmission channel according to claim 4, wherein said transconductance amplifier gain stage further includes a second transconductance amplifier circuit coupled to an output of said first gain amplifier and having an output coupled in circuit with a second gain amplifier from which said output voltage is available for application to voltage-sense, voltage-fed circuitry.

6. A transmission channel according to claim 4, wherein said first transconductance amplifier circuit includes a filter circuit that is programmable to define the pass band of said transmission channel for AC signals coupled therethrough to said downstream voltage-fed circuitry.

7. A transmission channel for a subscriber line interface circuit comprising:
  a current-sensing transimpedance stage, having tip and ring ports adapted to be coupled to tip and ring paths of a telecommunication wireline pair, and being operative to transform differentially sensed tip and ring input currents of said telecommunication wireline pair into a single ended voltage; and
  a transconductance amplifier gain stage coupled to receive said single ended voltage output by said current-sensing transimpedance stage, and being operative to produce an output voltage for application to downstream voltage-fed circuitry, wherein said transconductance amplifier gain stage includes
    an operational amplifier having a first, non-inverting input to which a reference voltage is applied, and a second, inverting input, and including an output stage coupled by way of a first current mirror circuit to a first voltage supply and coupled by way of a second current mirror circuit to a second voltage supply, said output stage having a first input/output port coupled by way of a feedback path to said second input of said operational amplifier, and a second input/output port coupled to a second current path between said first and second current mirror circuits, and providing said single ended voltage; and
    a gain amplifier having an input coupled to said second input/output port of said operational amplifier, and an output providing said output voltage at a gain for application to downstream voltage-fed circuitry.

8. A transmission channel for a subscriber line interface circuit comprising:
  a current-sensing transimpedance stage, having tip and ring ports adapted to be coupled to tip and ring paths of a telecommunication wireline pair, and being operative to transform differentially sensed tip and ring input currents of said telecommunication wireline pair into a single ended voltage; and
  a transconductance amplifier gain stage coupled to receive said single ended voltage output by said current-sensing transimpedance stage, and being operative to produce an output voltage for application to downstream voltage-fed circuitry, wherein said transimpedance stage includes
    a first operational amplifier having first and second complementary polarity inputs and an output;
    a tip path sense resistor coupled to said tip port;
    a first differential coupling circuit coupled between said tip path sense resistor and said first and second complementary polarity inputs of said first operational amplifier, and being operative to apply a first differential input current to said first and second complementary polarity inputs of said first operational amplifier in accordance with a first voltage across said tip path sense resistor;

a ring path sense resistor coupled to said ring port;

a second differential coupling circuit coupled between said ring path sense resistor and said first and second complementary polarity inputs of said first operational amplifier, and being operative to apply a second differential input current to said first and second complementary polarity inputs of said first operational amplifier in accordance with a second voltage across said ring path sense resistor; and a linearity compensator circuit coupled between a supply voltage node and said first and second complementary polarity inputs of said operational amplifier, and being operative to close a negative feedback path from said output of said operational amplifier to said first input of said operational amplifier, relative to a voltage balancing path coupled to said second input of said operational amplifier, and equalize voltages applied thereby to said first and second complementary polarity inputs of said operational amplifier, irrespective of variations in currents through said tip path and ring path sense resistors; and wherein said transconductance amplifier gain stage includes a second operational amplifier having a first, non-inverting input to which a reference voltage is applied, and a second, inverting input, and including an output stage coupled by way of a first current mirror circuit to a first voltage supply and coupled by way of a second current mirror circuit to a second voltage supply, said output stage having a first input/output port coupled by way of a feedback path to said second input of said second operational amplifier, and a second input/output port coupled to a second current path between said first and second current mirror circuits, and providing said single ended voltage; and a gain amplifier having an input coupled to said second input/output port of said second operational amplifier, and an output providing said output voltage at a gain for application to downstream voltage-fed circuitry.

9. A transmission channel for a subscriber line interface circuit comprising:

a tip/ring current-sensing transimpedance stage, having tip and ring sense resistors adapted to be coupled to tip and ring paths of a-telecommunication wireline pair, and being operative to transform differentially sensed tip and ring input currents sensed by said tip and ring sense resistors into a single ended voltage; and a transconductance amplifier filter/gain stage, configured to provide a programmable output impedance, and being coupled to convert said single ended voltage output by said current-sensing transimpedance stage an output transmission voltage for application to a telecommunication circuit, wherein said transimpedance stage includes a first operational amplifier having first and second complementary polarity inputs and an output;

a tip path sense resistor coupled to said tip port;

a first differential coupling circuit coupled between said tip path sense resistor and said first and second complementary polarity inputs of said first operational amplifier, and being operative to apply a first differential input current to said first and second complementary polarity inputs of said first operational amplifier in accordance with a first voltage across said tip path sense resistor;

a ring path sense resistor coupled to said ring port;

a second differential coupling circuit coupled between said ring path sense resistor and said first and second complementary polarity inputs of said first operational amplifier, and being operative to apply a second differential input current to said first and second complementary polarity inputs of said first operational amplifier in accordance with a second voltage across said ring path sense resistor; and a linear compensator circuit coupled between a supply voltage node and said first and second complementary polarity inputs of said operational amplifier, and being operative to close a negative feedback path from said output of said operational amplifier to said first input of said operational amplifier, relative to a voltage balancing path coupled to said second input of said operational amplifier, and equalize voltages applied thereby to said first and second complementary polarity inputs of said operational amplifier, irrespective of variations in currents through said tip path and ring path sense resistors; and wherein said transconductance amplifier gain stage includes a second operational amplifier having a first, non-inverting input to which a reference voltage is applied, and a second, inverting input, and including an output stage coupled by way of a first current mirror circuit to a first voltage supply and coupled by way of a second current mirror circuit to a second voltage supply, said output stage having a first input/output port coupled by way of a feedback path to said second input of said second operational amplifier, and a second input/output port coupled to a second current path between said first and second current mirror circuits, and providing said single ended voltage; and a gain amplifier having an input coupled to said second input/output port of said second operational amplifier, and an output providing said output voltage at a gain for application to downstream voltage-fed circuitry.

10. A transmission channel according to claim 9, wherein said transconductance amplifier filter/gain stage is configured to be coupled to an external impedance for programming said output impedance presented to said telecommunication circuit.

11. A transmission channel according to claim 9, wherein said transconductance amplifier filter/gain stage includes a first transconductance amplifier circuit coupled in circuit with a first gain amplifier from which said output voltage is available for application to said telecommunication circuit.

12. A transmission channel according to claim 11, wherein said transconductance amplifier filter/gain stage further includes a second transconductance amplifier circuit coupled to an output of said first gain amplifier and having an output coupled in circuit with a second gain amplifier from which said output voltage is available for application to said telecommunication circuit.

13. A transmission channel according to claim 11, wherein said first transconductance amplifier circuit includes a filter circuit that is programmable to define the pass band of said transmission channel for AC signals coupled therethrough to said telecommunication circuit.

* * * * *